Figure 1:
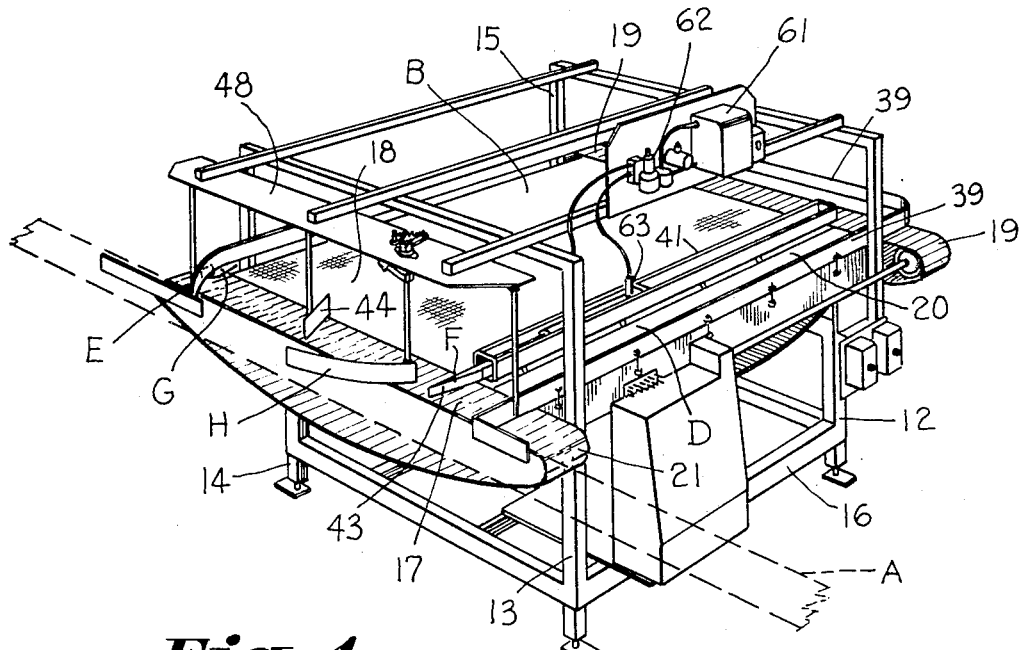

United States Patent

Tice

[11] 3,734,267
[45] May 22, 1973

[54] ARTICLE STORING AND RECIRCULATING DEVICE

[76] Inventor: Joseph Tice, 502 Poinsettia Drive, Simpsonville, S.C.

[22] Filed: Sept. 30, 1971

[21] Appl. No.: 185,116

[52] U.S. Cl. .................. 198/30, 198/37, 198/193
[51] Int. Cl. ....................... B65g 47/26, B65g 43/08
[58] Field of Search .................. 198/30, 29, 193, 198/37

[56] References Cited

UNITED STATES PATENTS

| 3,604,551 | 9/1971 | Fink | 198/30 |
| 2,920,738 | 1/1960 | Carter | 198/30 |
| 2,953,234 | 9/1960 | Abendschein | 198/30 |
| 581,770 | 5/1897 | Reeves | 198/193 |
| 2,743,807 | 5/1956 | McKune | 198/30 |

Primary Examiner—Richard E. Aegerter
Attorney—Bailey & Dority

[57] ABSTRACT

An apparatus for transferring and accumulating articles being moved along a main conveyor. A recirculating conveyor is carried adjacent the main conveyor for receiving the articles from the main conveyor responsove to overloading. Means are provided for automatically returning the articles to the main conveyor when the overloading ceases. A pivotal member is provided adjacent the main conveyor for feeding the articles being returned to the main conveyor into vacant spaces between the articles traveling on the main conveyor. The recirculating conveyor includes belts which are beveled on the edge so as to provide a smooth transfer from a belt traveling in a direction normal thereto.

7 Claims, 8 Drawing Figures

Patented May 22, 1973

3,734,267

3 Sheets-Sheet 1

INVENTOR.
JOSEPH TICE
BY
Bailey & Dority
ATTORNEYS.

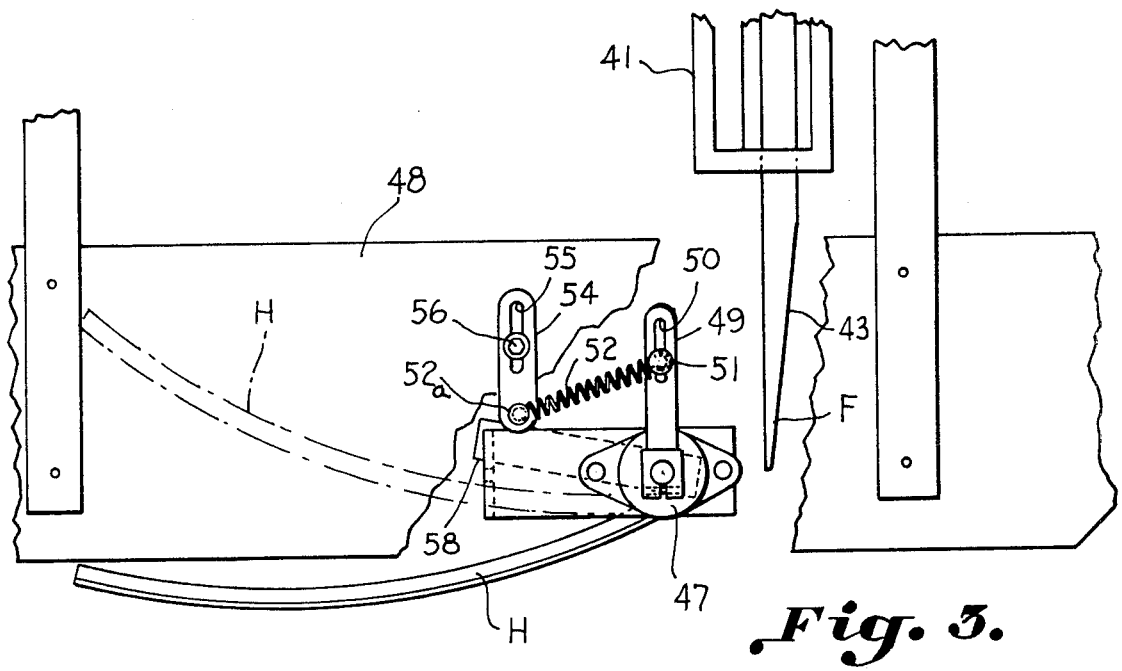
Fig. 3.
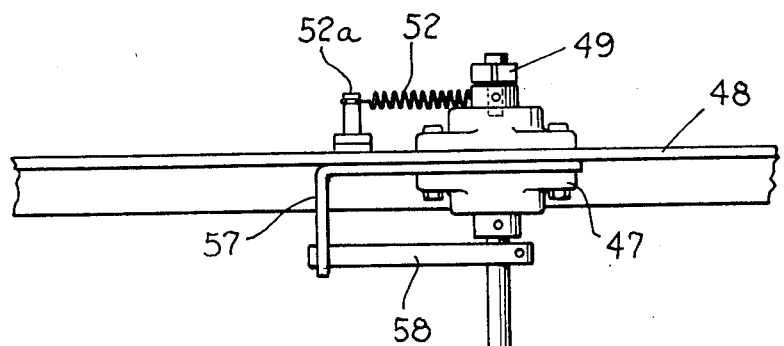
Fig. 4.
INVENTOR.
JOSEPH TICE
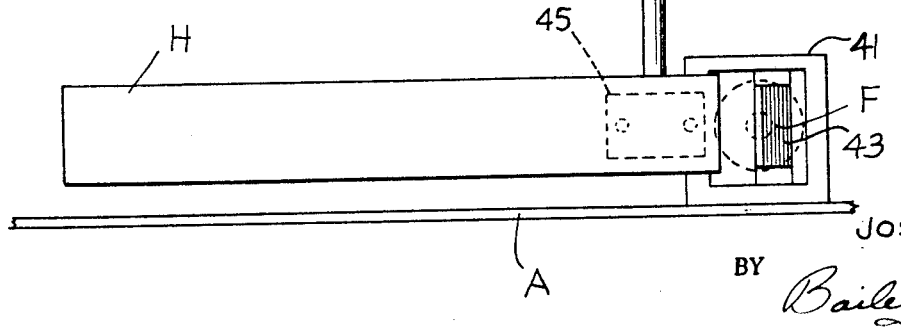
ATTORNEYS.

Fig. 6·A.

INVENTOR.
JOSEPH TICE
BY
Bailey & Doity
ATTORNEYS.

ARTICLE STORING AND RECIRCULATING DEVICE

This invention relates to an article accumulator and more particularly to an accumulator which will automatically accumulate the articles being transferred from a main conveyor responsive to the main conveyor overloading.

It has become apparent in automated systems wherein articles such as bottles, cans, etc., which are being transferred on a main conveyor to a particular receiving station, such as an inspection station or filling station, that if for some reason the flow of bottles on the main conveyor is greater than the capacity of the receiving station either through shut down of the receiving station, or for some other reason rather than stopping the main conveyor the articles should be diverted to a temporary storage area such as an accumulator.

Heretofore, accumulators have been utilized wherein the operator manually placed a deflecting member across the main conveyor and deflected the articles onto the accumulating conveyor system. When the overloading on the main conveyor ceased the operator removed the deflecting member and directed the articles that have been accumulated on the accumulator back onto the main conveyor. Normally, such storage accumulators included conveyors positioned at right angles to each other so that the articles are diverted from the main conveyor. Since the conveyors are at right angles to each other, the direction of flow of the articles shifts abruptly. One problem with such conveyor systems is at the junction between mating conveyors wherein the article is transferred from one conveyor to the other conveyor, moving at a right angle thereto. It is important especially when transferring small articles that the transfer take place smoothly in order to minimize tipping or turning over of the articles. Attempts have been made to utilize dead plates in the junction between the perpendicular belts so that the upper surfaces over which the articles are being moved are maintained even. One problem in utilizing dead plates is that sometimes articles moving thereover will remain thereon.

The accumulator constructed in accordance with the present invention utilizes a completely live deck so that the articles located thereon are always moving and it is not necessary for them to be pushed over any particular area.

Accordingly, it is an important object of the present invention to provide an apparatus for accumulating and transferring articles, as well as shifting the direction of flow of such articles.

Another important object of the present invention is to provide an apparatus which can be positioned adjacent a main line conveyor over which articles are being transferred so that when overloading of the articles on the main line conveyor occurs such will automatically be transferred onto the apparatus and returned to the main conveyor responsive to the overloading ceasing.

Another important object of the present invention is to provide a conveyor system which utilizes at least a pair of conveyor belts positioned perpendicular to each other with the edge of the belt that abuts the end of the other conveyor being beveled so that the junction is minimized in order that a smooth transfer of articles thereover can take place.

Another important object of the present invention is to provide an apparatus for receiving articles from a main conveyor and automatically returning the articles to vacant spaces provided between the articles on the main conveyor, and if there are no vacant spaces between the articles on the main conveyor, recirculating the articles.

Still another object of the present invention is to provide an apparatus for accumulating articles when overloading occurs on the main conveyor and recirculating the articles until the overloading ceases.

The construction designed to carry out the invention will be hereinafter described, together with other features thereof.

Figure 2:
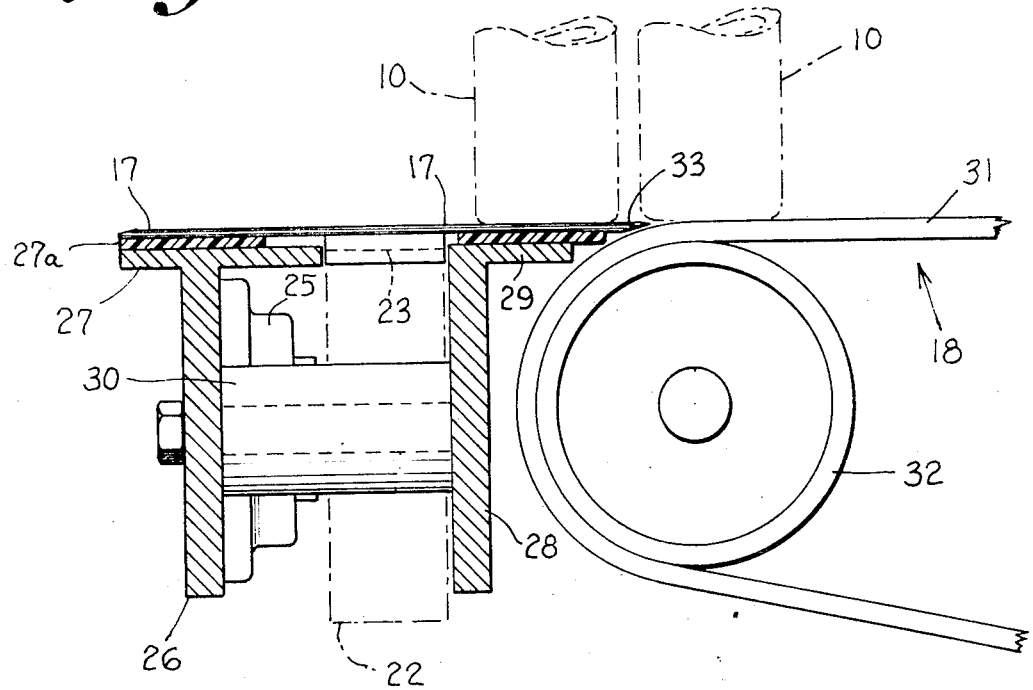
Figure 5:
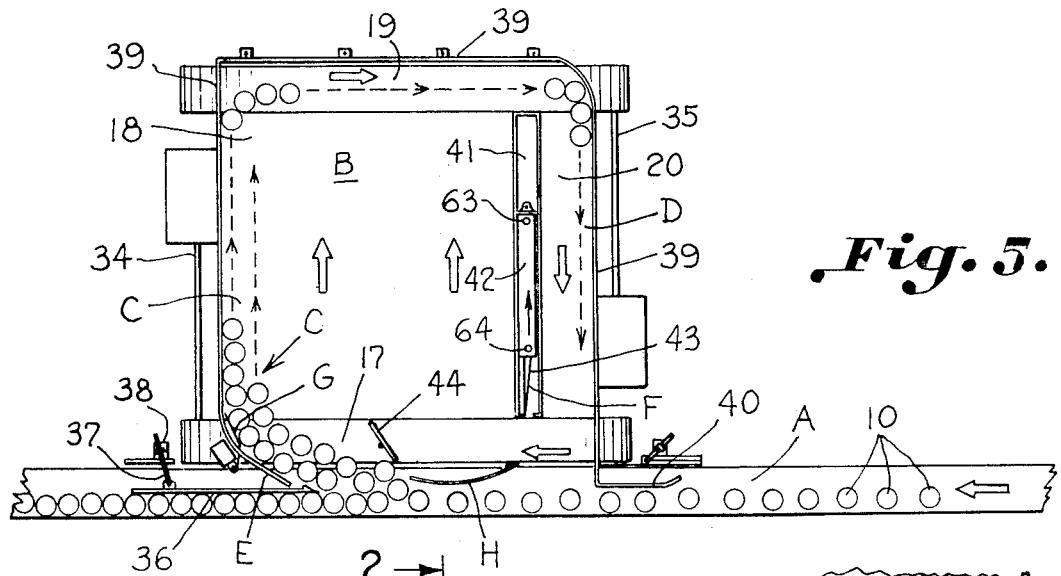
Figure 6:
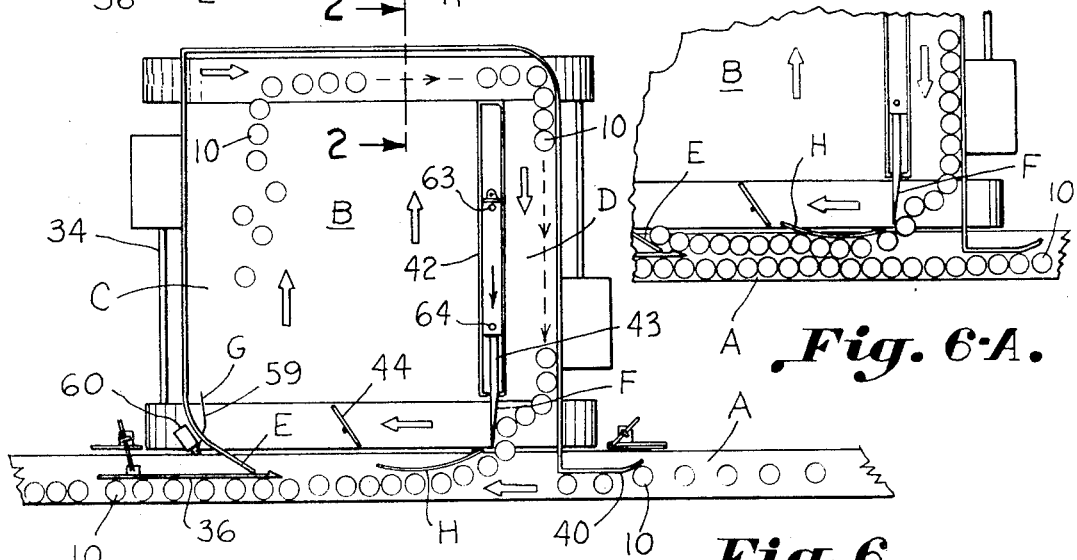
Figure 7:
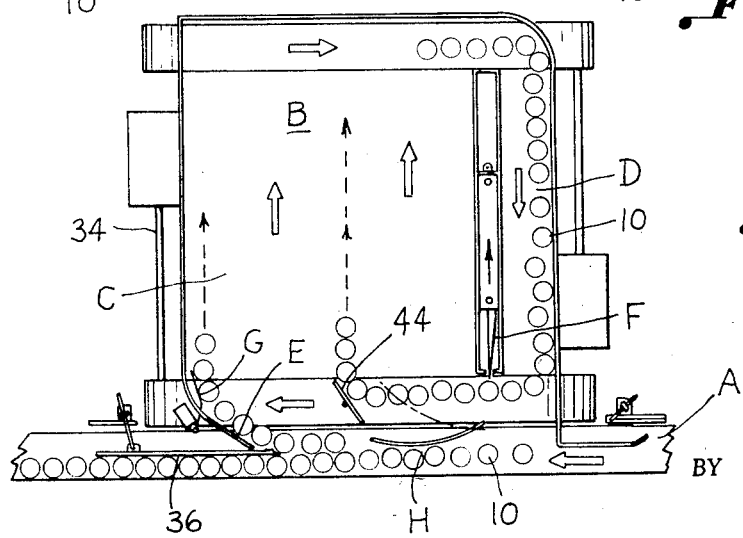

The invention will be readily understood from a reading of the following specification, and by reference to the accompanying drawings forming a part thereof, wherein an example of the invention is shown and wherein:

FIG. 1 is a perspective view of an apparatus for accumulating and transferring articles from a main conveyor constructed in accordance with the present invention, FIG. 2 is an enlarged sectional view taken along line 2—2 of FIG. 6, illustrating the beveled edge of the conveyor belt at a junction formed with another conveyor belt positioned perpendicular thereto, FIG. 3 is an enlarged plan view with parts broken away, illustrating a pivotal member utilized in directing articles back onto the main conveyor, as well as illustrating a pneumatic guide member which controls the flow of bottles from the recirculating conveyor, FIG. 4 is an enlarged side elevational view illustrating the pivotal member and the guide member, best shown in FIGS. 1 and 3, FIG. 5 is a plan view illustrating the articles being transferred from a main conveyor onto the recirculating conveyor, FIG. 6 is a plan view illustrating the articles being returned to the main conveyor, FIG. 6A is a plan view illustrating the articles being returned to the recirculating conveyor when there is no room on the main conveyor for such to be returned thereto, FIG. 7 is a plan view illustrating the articles being transferred from the main conveyor onto the recirculating conveyor and being recirculated thereon.

The drawings illustrate an apparatus for transferring and accumulating articles being moved along a main conveyor A. The apparatus includes a recirculating conveyor B carried adjacent the main conveyor A in article transfer relationship therewith so that when the articles begin overloading the main conveyor such are directed onto the recirculating conveyor B. The recirculating conveyor has a rear receiving portion C which receives the articles from the main conveyor and a forward return portion D over which the articles are shifted back onto the main conveyor A. The guide means E is carried adjacent the rear receiving portion C of the recirculating conveyor B and directs the articles from the main conveyor A onto the recirculating conveyor B when the articles begin overloading the main conveyor. Means are provided for driving the recirculating conveyor B so that the articles being transferred onto the recirculating conveyors from the main conveyor A are shifted to the forward return portion D. A movable guide means F is carried adjacent the forward return portion D of the recirculating conveyor B and is capable of shifting from a first position to a second position so that when it is in a first position the articles being shifted over the forward return portion D are directed back onto the main conveyor A and when it is in the second position the articles remain on the recirculating conveyor B. Sensing means G is provided for shifting the movable guide means F from the first position to the second position responsive to the articles being transferred from the main conveyor A to the recirculating conveyor B. Thus, when the main conveyor is overloaded with articles the articles are transferred to the recirculating conveyor B and returned to the main conveyor when overloading ceases. The apparatus is also provided with a pivotal means H which directs the articles being returned to the main conveyor into vacant spaces provided between the articles, and if there are no spaces pivots rearwardly so that the articles can be returned to the recirculating conveyor B.

The main conveyor A can be any conventional elongated conveyor belt over which the articles are transferred. As shown in FIG. 5, the articles 10 may be bottles being moved to an inspection station or to a station where such are filled with the desired contents. If the receiving station is shut down or slowed down, the bottles 10 will begin to back up on the main conveyor, requiring the main conveyor to be stopped if such condition is allowed to persist. Frequently, it is not desired to stop the main conveyor A since it may be delivering the articles 10 from a continuous supply, such as molds. In order to relieve the overloading condition an accumulator is positioned adjacent the main conveyor for diverting and recirculating the articles 10 until the overloading condition ceases. The accumulator includes a recirculating conveyor B which is supported on upright frame members closely adjacent the main line conveyor A. The supporting frame members includes vertical posts 12 through 15 which are joined by lower braces 16. Other suitable braces and framework are utilized for strengthening the recirculating conveyor, but not shown and described for purposes of clarity. The recirculating conveyor B includes an in-feed conveyor belt 17 which is positioned parallel to the main conveyor and closely adjacent thereto so that articles can be shifted smoothly from the main conveyor A to the in-feed conveyor 17. An accumulating conveyor 18 is carried perpendicular to the in-feed conveyor and positioned with one end closely adjacent the side of the in-feed conveyor so that articles can be transferred easily therebetween. The other end of the in-feed conveyor 18 is positioned adjacent a cross-feed conveyor 19 that travels rearwardly. Interposed between the other end of the cross-feed conveyor 19 and the in-feed conveyor is a return conveyor 20.

The in-feed conveyor includes an endless hinge joint chain belt constructed of metallic links 21 and is generally referred to as a table top chain conveyor belt. The in-feed conveyor 17 is driven by a rotating sprocket 22 shown in phantom lines in FIG. 2 which engages a downwardly turned edge 23 of the links 21 to drive such in a forward direction. The sprocket 23 is, in turn, carried on a driven shaft that has one end journalled in a bearing 25 mounted on an upright frame member 26. A horizontal plate 27 is carried adjacent the top of the upright frame member 26 for supporting the upper portion of the belt 17 in a horizontal plane. Positioned between the plate 27 and the belt 17 is a wear plate constructed of high molecular weight polyethylene. Another upright frame member 28 is spaced from the upright member 26, and has a horizontal top portion 29 carried adjacent the top thereof for supporting the inner edge of the conveyor chain 17. A spacer 30 is provided between the upright frame members 26 and 28. It is to be understood, of course, that the chain conveyors may be supported and are driven by many different types of mechanism, and such are not described in detail since they are conventional.

Positioned perpendicular to the in-feed conveyor 17 is the accumulating conveyor 18 which includes an endless belt 31. As noted in FIG. 2, the endless belt 31 forming a part of the accumulating conveyor 18 is journalled between a pair of spaced rollers 32 which drive and maintain the upper surface of the conveyor belt 31 taut. Only one of the space rollers is shown and the one not shown is carried adjacent the cross-feed conveyor 19. One of the rollers 32 is driven for propelling the belt 31. The lower edge 33 of the top portion of the in-feed belt 17 is beveled to an angle corresponding to the tangent of the end of belt 31 of the accumulating conveyor so that at the junction where the belts 17 and 31 meet there is a very small gap permitting the articles to flow smoothly thereover. In order to obtain this small gap at the junction between the belts 17 and 31 the roller 32 is positioned so that the inner end of the belt 31 extends inwardly beyond the outer edge of the in-feed conveyor belt 17. In one particular embodiment the angle of the bevel is 30°.

The cross-feed conveyor 19 mates with the other end of the accumulating conveyor 18 and has its inner edge beveled in the same manner as the in-feed conveyor 17. As best seen in FIGS. 5 through 7, the width of the accumulating conveyor 17 is much greater than the width of the in-feed and cross-feed conveyors 17 and 18. This is to allow a large amount of articles 10 to accumulate on the accumulating conveyor C. Interposed between the forward ends of the in-feed conveyor 17 and the cross-feed conveyor 19 is a return conveyor 20. The return conveyor 20 is carried on rolls similar to that of the accumulator conveyor and mates with the beveled inner edges of the in-feed and cross-feed conveyors 17 and 19, respectively, in the same manner as the accumulating conveyor 18. Thus, as can be seen, the recirculating conveyor B includes the in-feed conveyor 17, the accumulating conveyor 18, the cross-feed conveyor 19, and the return conveyor 20.

Means including a rotating shaft 34 is provided for rotating the sprocket 22 and the in-feed belt 17 carried thereon in the forward direction. Means is also provided for driving the accumulating conveyor 18 in a direction away from the in-feed conveyor such as shown by the arrow in FIGS. 5 through 7. The means for driving the cross-feed conveyor 19 rearwardly includes a driven rotating shaft 35. The return conveyor 20 is driven by means which rotates the conveyor 20 in a direction towards the in-feed conveyor 17 as illustrated by the arrows in FIGS. 5 through 7. The shaft 34 which rotates the in-feed conveyor and the drive means which rotates the accumulating conveyor 18 includes a gear box which has a pair of output shafts and an input shaft which is driven by a variable speed D.C. motor. The shaft 35 which drives the cross-feed conveyor and the return conveyor 20, is also driven by a gear box which has a pair of output shafts and an input shaft that is connected to a variable speed D.C. motor. In one particular embodiment, the in-feed conveyor 17, the cross-feed conveyor 19, and the return conveyor 20 are driven at twice the speed of the accumulating conveyor 18 with the speed of the accumulating conveyor 18 being variable between 1 to 5 feet per minute and the other conveyors 17, 19 and 20 being variable between 2 to 10 feet per minute. The couplings between the gear boxes and the conveyor belts are not disclosed since such are conventional drives.

A guide means E is provided adjacent the rear receiving portion C of the accumulating conveyor 18 for directing the articles 10 from the main conveyor onto and across the in-feed conveyor 17 when overloading of the main conveyor A occurs. This guide means takes the form of an elongated vertical partitioning plate 36 which is carried approximately in the middle of the main conveyor A. The rear end of the plate 36 is supported by a bar 37 having its other end suitably mounted on a bracket 38 carried on the frame of the machine. The inner end of the vertical partitioning plate 36 is attached to arcuate shaped guide means E which extend over the in-feed conveyor 17 and terminates adjacent the middle of the main conveyor A. The arcuate shaped plate extends into a vertical boundary wall 39 which extends around the recirculating conveyor B for confining the articles thereon. The forward end of the retaining wall 39 terminates in a flange deflecting portion 40 carried over the main conveyor A.

Positioned between the accumulating conveyor 18 and the return conveyor 20 is a dividing partition 41 in which the movable guide means F is carried. The movable guide means F includes a double acting pneumatic cylinder 42 which has a tapered blade 43 forming part of the piston. The tapered blade 43 is capable of assuming a first or second position. When in the first position, such as illustrated in FIG. 6, the blade 43 is extended and directs the articles 10 being shifted over the forward return portion D of the return conveyor back onto the main conveyor A. The blade 43 is tapered towards the rear of the machine so that as the articles 10 engage such they tend to move outwardly towards the main conveyor A.

When the blade 43 of the movable guide F is in the retracted position the articles being moved by the return conveyor 20 are fed onto in-feed conveyor 17 and shifted by the in-feed conveyor forward until such engages a deflection gate 44 which directs the articles 10 back onto the accumulating conveyor 18. As can be seen in FIG. 1, the deflection gate 44 is supported by the framing carried above the conveyor system.

A pivotal means H taking the form of an arcuate shaped arm is provided to pivot adjacent the end of the blade 43 when in an extended position so that as the articles are returned back across the in-feed conveyor 17 onto the main conveyor, if there is a space between the articles, as illustrated in FIG. 6, the articles 10 are directed between the spaces. However, if there is no space between the articles 10 moving along the main conveyor A, such as illustrated in FIG. 6A, the pivotal means H pivots rearwardly and the articles are moved along the inner edge of the main conveyor A until they engage the arcuate guide means E and return to the accumulating conveyor 18. The pivotal arm forming part of the pivotal means H is attached by means of a bracket 45 to the lower end of a rod 46. The upper end of the rod 46 extends through a bearing member 47 suitably supported on the overhead frame 48. An outwardly extending arm 49 is carried on the upper end of the rod 46 and has a slot 50 provided therein. A bolt 51 extends through the slot 50 and has attached thereto, one end of a spring 52. The other end of the spring 52 is anchored by a bolt 52a to an arm 54 mounted on the upper frame member 48. The arm 54 has a slot 55 provided therein through which the bolt 56 extends so that its position can be shifted relative to the upper frame member 48 for adjusting the tension in the spring 52. The tension in the spring 52 can also be adjusted by moving the bolt 51 within the slot 50. It is desired that the tension be sufficient so that the guide arm H will direct the articles returning to the main conveyor between the vacancies in the articles flowing along the main conveyor, but if there are no vacant spaces on the main conveyor, such as illustrated in FIG. 6A, the arm H is pivoted rearwardly and the articles 10 are directed into the guide means E for return to the accumulating conveyor. An abutment 57 extends downwardly from the upper frame member 48 for engaging an outwardly extending stop 58 carried on the rod 46 for limiting the outward movement of the pivotal arm H.

A sensing means G is carried adjacent the guide means E and the rear receiving portion C of the accumulating conveyor B for detecting when articles are being deflected onto the accumulating conveyor 18 so as to activate the movable guide means F to cause such to be retracted to the position illustrated in FIG. 5. The sensing means G includes an arm 59 forming a part of a microswitch 60 which, when depressed by the articles being transferred from the main conveyor, closes the microswitch. The microswitch 60 is connected in an electrical circuit between a source of electrical power and a time-delay relay 61. The output of the time-delay relay 61 is coupled to a solenoid valve 62 for controlling the operation of such. The solenoid valve 62 is coupled between a pressurized source of gas, such as air, and the input ports 63 and 64 of the pneumatic cylinder 42. When the switch 60 is closed by the article 10 engaging the arm 59 of the sensing means G the solenoid valve is activated to allow pressurized air to enter the input port 64 of the cylinder 42 to retract the blade 43. The purpose of the time-delay relay 61 is to prevent frequent switching of the microswitch. The time-delay relay can be adjusted to close the circuit after an elapse of time of 30 seconds to 2 minutes. Therefore, it takes more than a single article passing over the switch arm 59 to cause the relay 61 to be activated in order to retract the movable blade 43. When the solenoid valve is de-energized the pressurized gas is allowed to flow into input port 63 to extend the blade 43.

In summarizing the operation, reference is made to FIGS. 5 through 7. In FIG. 5 the articles are shown as being backed up onto the main conveyor A as a result of either the receiving station being inoperative or the flow of articles being too great and, therefore, the guide mean E deflects some of the articles onto the rear receiving portion of the recirculating conveyor B. This causes the sensing means G to be activated, which in turn, causes the blade 43 of the movable guard F to be retracted. The articles being fed onto the recirculating conveyor are circled rearwardly in a counterclockwise direction back onto the in-feed conveyor 17. The articles are then moved forward, such as illustrated in FIG. 7, on the in-feed conveyor 17 until such strikes the deflection plate 44 to feed them back onto the accumulating conveyor 18. This continues until the overloading of a main conveyor ceases at which time the microswitch 60 forming a part of the sensing means G is allowed to open, such as illustrated in FIG. 6. When this occurs the tapered blade 43 forming part of the movable guide means F is extended to deflect the articles back onto the main conveyor A. As shown in FIG. 6 the pivotal means H is extended and directs the articles into the vacant spaces therebetween. If there are no vacant spaces between the articles on the main conveyor A, the articles being returned from the recirculating conveyor B overcomes the tension provided in spring 52 associated with the pivotal arm H to cause the arm to be pivoted rearwardly, such as shown in FIG. 6A and the articles are shifted down the main conveyor A until such strikes the guide means E and are returned to the recirculating conveyor B.

Thus, as seen from FIGS. 5 through 7, when overloading occurs on conveyor A the excessive articles are automatically shifted onto the recirculating conveyor B and recirculated until the overloading ceases.

At the junctions where the accumulator conveyor 18 and the return conveyor 20 mate with the in-feed conveyor 17 and the cross-feed conveyor 19, there is a smooth transfer since the inner edges of the in-feed conveyor 17 and cross-feed conveyor 19 are beveled, such as illustrated in FIG. 2, so that there is a very small gap. The degree of bevel in one particular embodiment, is 30°. However, such would depend on the radius of the rolls supporting the accumulating conveyor belt 18 and the return conveyor belt 20. It is desired that the angle of the beveled edge 33 correspond to the tangent of the curved end of the accumulating and return belts 18 and 20, respectively.

While a preferred embodiment of the invention has been described using specific terms, such description is for illustrative purposes only, and it is to be understood that changes and variations may be made without departing from the spirit or scope of the following claims.

What is claimed is:

1. An apparatus for removing articles being moved on a main conveyor responsive to overloading of said articles on said main conveyor and feeding said articles back onto said main conveyor when the overloading ceases comprising: an in-feed conveyor carried adjacent and parallel to said main conveyor, an accumulating conveyor carried substantially transverse to said in-feed conveyor with one end closely adjacent said in-feed conveyor, a cross-feed conveyor carried closely adjacent the other end of said accumulating conveyor, a return conveyor having one end closely adjacent said cross-feed conveyor and the other end closely adjacent said in-feed conveyor, means for rotating said main conveyor and said in-feed conveyor in a forward direction, means for rotating said accumulating conveyor in a direction away from said main conveyor, means for rotating said cross-feed conveyor rearwardly, means for rotating said return conveyor towards said main conveyor, guide means carried adjacent a rear side of said accumulating conveyor extending over said in-feed conveyor and a portion of said main conveyor for deflecting said articles from said main conveyor onto said accumulating conveyor when said articles begin overloading said main conveyor, said in-feed conveyor, accumulating conveyor, cross-feed conveyor and said return conveyor being arranged in article transferring relationship so that the normal flow of articles being transferred to said in-feed conveyor is from said in-feed conveyor to said accumulating conveyor, said cross feed conveyor, said return conveyor back onto said in-feed conveyor, sensing means producing a signal responsive to articles being transferred from said main conveyor to said accumulating conveyor, a movable guide means carried adjacent said return conveyor capable of assuming an extended position and a retracted position and, means for actuating said movable guide means responsive to receiving said signal from said sensing means for causing said movable guide means to shift from an extended position to a retracted position so that when said movable guide means is in the extended position articles leaving said return conveyor are directed onto said main conveyor and when said movable guide means is in the retracted position articles leaving said return conveyor are directed onto said in-feed conveyor.

2. The apparatus as set forth in claim 1 wherein said sensing means includes a switch means coupled to said means for actuating said movable guide means capable of being activated by said articles being deflected from said main conveyor to said in-feed conveyor for causing said movable guide means to be retracted when activated and to be extended when deactivated.

3. The apparatus as set forth in claim 2 wherein, said movable guide means and said means for actuating said movable guide means includes a pneumatic cylinder provided with a tapered blade that moves longitudinal therein, a source of electrical power, a source of pressurized gas coupled to said pneumatic cylinder, a solenoid valve coupled between said source of pressurized gas and said pneumatic cylinder for controlling the flow of gas to said pneumatic cylinder, and said switch means being coupled to said source of electrical power and said solenoid valve for causing said solenoid valve to be energized responsive to said articles being deflected from said main conveyor.

4. The apparatus as set forth in claim 3 further comprising: a time-delay relay electrically coupled between said switch means and said solenoid valve for preventing said solenoid valve from being energized responsive to said switch means being closed by articles being deflected from said main conveyor until a predetermined period of time elapses.

5. An apparatus for transferring and accumulating articles being moved along a main conveyor comprising: a recirculating conveyor means carried adjacent said main conveyor in article transferring relationship therewith, said recirculating conveyor means having a rear receiving portion for receiving articles from said main conveyor and a forward return portion over which articles are shifted back onto said main conveyor, a guide means carried adjacent said rear receiving portion of said recirculating conveyor means for directing said articles from said main conveyor onto said recirculating conveyor means when said articles begin overloading said main conveyor, means for driving said recirculating conveyor means so that articles being transferred onto said recirculating conveyor means from said main conveyor are shifted to said forward return portion, movable guide means carried adjacent said forward return portion of said recirculating conveyor means capable of shifting from a first position to a second position so that when said movable guide means is in a first position said articles being shifted over said forward return portion are directed back onto said main conveyor and when in a second position said articles remain on said recirculating conveyor, sensing means producing a signal responsive to sensing articles being transferred from said main conveyor to said recirculating conveyor, and means for actuating said movable guide means operated by said sensing means for causing said movable guide means to shift from said first position to said second position, whereby when said main conveyor is overloaded with articles said articles are transferred to said recirculating conveyor and returned to the main conveyor when overloading ceases.

6. The apparatus as set forth in claim 5 further comprising: a pivotal means carried adjacent said forward return portion and said main conveyor for directing said articles being returned from said forward return portion to said main conveyor into vacant spaces between articles on said main conveyor and when there are no vacant spaces between said articles on said main conveyor pivoting rearwardly under pressure exerted by said returning articles to allow said articles to be returned to said recirculating conveyor.

7. An apparatus for transferring articles from one direction of flow to another direction of flow normal to said one direction of flow comprising: a first conveyor including an elongated endless belt journalled for rotation, means for rotating said belt of said first conveyor in one direction, a second conveyor including an elongated endless belt, a pair of spaced rolls, said endless belt of said second conveyor being journalled on said spaced rolls defining an elongated looped belt with the end of said looped belt having a radius defined by the radius of said rolls, one end of said second conveyor abutting said first conveyor with the belts of each conveyor being on the same plane, means for rotating said second conveyor in a direction normal to said first conveyor, and an edge of said endless belt of said first conveyor being beveled so that the end of said looped belt of said second conveyor extends slightly under said beveled edge with the upper surfaces of said belts closely adjacent each other and on the same plane, whereby articles being moved on one conveyor can be transferred smoothly to the other conveyor moving in a direction normal thereto with a minimum of disturbance to the article being transferred.

* * * * *